(12) United States Patent
Wong et al.

(10) Patent No.: US 8,228,430 B2
(45) Date of Patent: Jul. 24, 2012

(54) IMAGE PROCESSING DEVICE AND DEINTERLACING METHOD THEREOF

(75) Inventors: Raymond Wong, Danville, CA (US); Yung-Wei Chen, Taipei (TW)

(73) Assignee: Silicon Motion, Inc., Jhubei, Hsinchu County (TW)

( * ) Notice: Subject to any disclaimer, the term of this patent is extended or adjusted under 35 U.S.C. 154(b) by 378 days.

(21) Appl. No.: 12/630,025

(22) Filed: Dec. 3, 2009

(65) Prior Publication Data

US 2011/0032418 A1 Feb. 10, 2011

(30) Foreign Application Priority Data

Aug. 5, 2009 (TW) .............................. 98126332 A

(51) Int. Cl.
*H04N 7/01* (2006.01)
(52) U.S. Cl. ..................................................... 348/448
(58) Field of Classification Search .......... 348/441–459, 348/699–701, 624
See application file for complete search history.

(56) References Cited

U.S. PATENT DOCUMENTS

| | | | | |
|---|---|---|---|---|
| 7,091,944 B2* | 8/2006 | Wang | | 345/100 |
| 7,397,515 B2* | 7/2008 | Walls et al. | | 348/624 |
| 7,834,873 B2* | 11/2010 | Kurupati | | 345/423 |
| 7,978,265 B2* | 7/2011 | Chao | | 348/452 |
| 8,035,748 B2* | 10/2011 | Wyman et al. | | 348/609 |
| 8,045,053 B2* | 10/2011 | Bae | | 348/448 |
| 2007/0200950 A1* | 8/2007 | Bae | | 348/452 |
| 2008/0062309 A1* | 3/2008 | Zhai et al. | | 348/452 |
| 2011/0032418 A1* | 2/2011 | Wong et al. | | 348/448 |

FOREIGN PATENT DOCUMENTS

CN 101312490 11/2008

OTHER PUBLICATIONS

Chinese language office action dated Aug. 5, 2011.
English language translation of abstract of CN 101312490 (published Nov. 26, 2008).

* cited by examiner

*Primary Examiner* — Paulos Natnael
(74) *Attorney, Agent, or Firm* — Thomas|Kayden

(57) ABSTRACT

An image processing device and a deinterlacing process thereof are provided. The deinterlacing process reads a memory to retrieve ten pixels of an image field that are temporarily stored in the memory, wherein the ten pixels are located on a first column, a second column, a third column, a fourth column and a fifth column of a first row and a second row of the image filed. Then, the deinterlacing process estimates the data of an interpolated pixel according to the data of the ten pixels. The interpolated pixel is inserted between the first and second rows of the image field on the third column to form a deinterlaced image frame.

14 Claims, 7 Drawing Sheets

IMAGE PROCESSING DEVICE AND DEINTERLACING METHOD THEREOF

CROSS REFERENCE TO RELATED APPLICATIONS

This application claims priority of Taiwan Patent Application No. 98126332, filed on Aug. 5, 2009, the entirety of which is incorporated by reference herein.

BACKGROUND OF THE INVENTION

1. Field of the Invention

The present invention relates to a deinterlacing process of an image processing fields, and more particularly, a deinterlacing process of an image processing field that converts a video from fields to frames.

2. Description of the Related Art

Interlacing is a technique for improving video quality without consuming extra data bandwidth. An interlacing process divides an image frame into two fields: an image field consisting of even lines of the image frame; and an image field consisting of odd lines of the image frame. The two image fields are conveyed in the system at different time. Thus, an image system with low-bandwidth can cope with the high quality image.

However, some image display systems do not support interlaced videos. For example, LCD panels, plasma TVs and so on mostly only support progressive videos and displays images frame by frame. Thus, deinterlacing techniques are called for to convert an interlaced video to a progressive video.

BRIEF SUMMARY OF THE INVENTION

The invention discloses image processing devices and deinterlacing methods thereof.

An exemplary embodiment of the image processing device comprises a memory, a data bus, a line buffer and a deinterlacing module. The memory in which an image field is temporarily stored is coupled to the data bus and the line buffer. The data bus and the line buffer are used in conveying and buffering data of ten pixels of the image field. The ten pixels are located on a first column, a second column, a third column, a fourth column and a fifth column of a first row and a second row of the image field. The deinterlacing module, coupled to the line buffer, estimates data for an interpolated pixel according to the data of the ten pixels. To form an image frame, the interpolcated pixel is inserted between the first and the second rows of the image field on the third column.

The invention further discloses a deinterlacing method. An exemplary embodiment of the deinterlacing method comprises: reading a memory to obtain data of ten pixels of an image field, wherein the ten pixels are located on a first column, a second column, a third column, a fourth column and a fifth column of a first row and a second row of the image field; and estimating data of an interpolated pixel according to the data of the ten pixels to form a deinterlaced image frame, wherein the interpolated pixel is inserted between the first and second rows of the image field on the third column.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
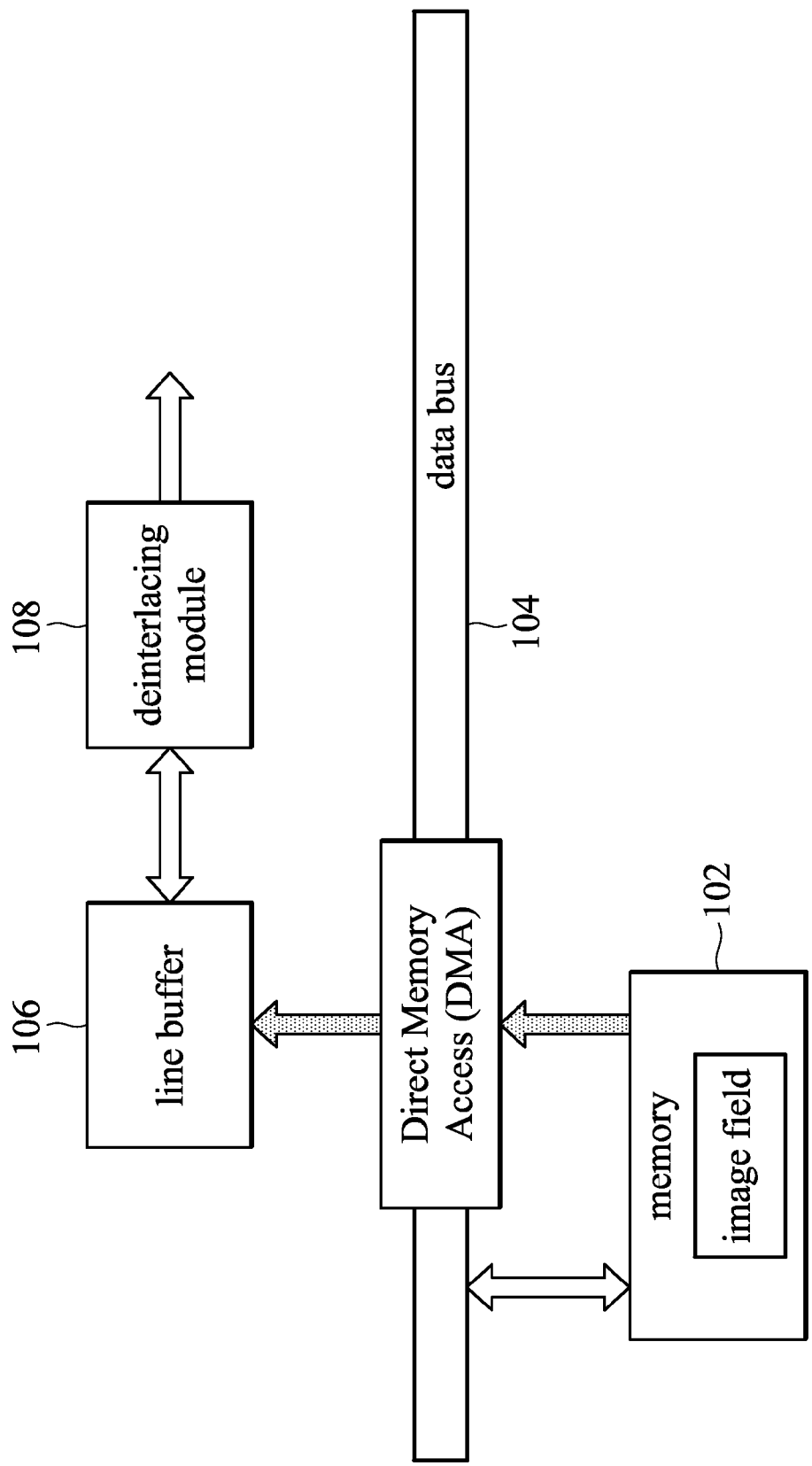
FIG. 1 depicts an exemplary embodiment of image processing device in accordance with the invention.

FIG. 1 depicts an exemplary embodiment of image processing device in accordance with the invention. As shown, the image processing device comprises a memory 102, a data bus 104 at least one line buffer 106 and a deinterlacing module 108. An image field is temporarily stored in the memory 102. The data bus 104 and the line buffer 106 are coupled to the memory 102 to convey and buffer data of ten pixels of the image field. The ten pixels are located on a first column, a second column, a third column, a fourth column and a fifth column of a first row and a second row of the image field. As the embodiment shows, a DMA (direct memory access) technique may be applied to access the memory 102. The deinterlacing module 108 is coupled to the line buffer 106 and, based on the data of the ten pixels, the deinterlacing module 108 estimates data of an interpolated pixel. To convert the image field to an image frame, the interpolated pixel is inserted between the first and second rows of the image field on the third column.

Figure 2:
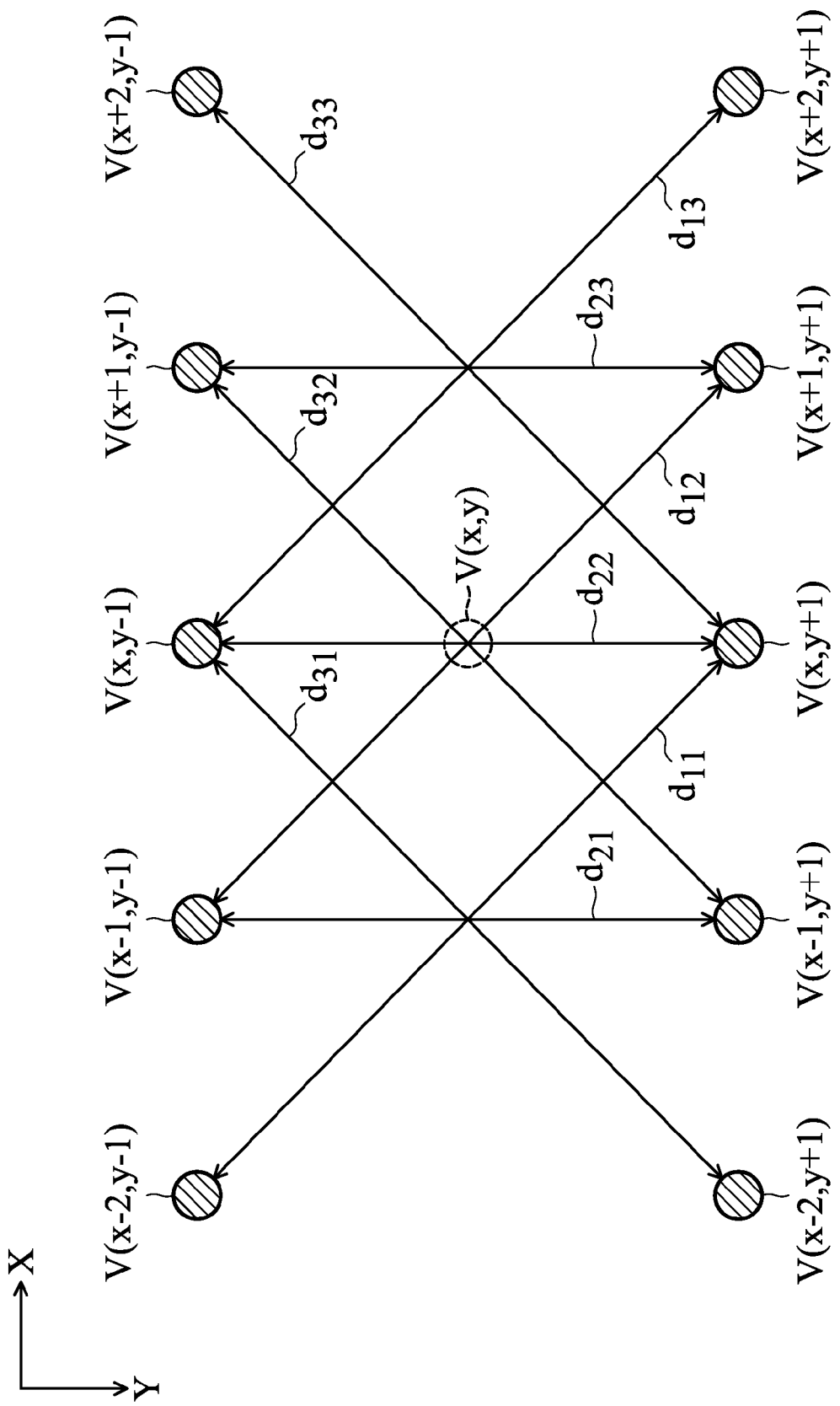
FIG. 2 shows ten pixels of an image field.

FIG. 2 shows ten pixels of an image field. The ten pixels are located on a first column (X=x−2), a second column (X=x−1), a third column (X=x), a fourth column (X=x+1) and a fifth column (X=x+2) of a first row (Y=y−1) and a second row (Y=y+1) of the image field, where x and y are integers. As shown, the pixels on the first, second, third, fourth and fifth columns of the first row are labeled V(x−2, y−1), V(x−1, y−1), V(x, y−1), V(x+1, y−1) and V(x+2, y−1), and the pixels on the first, second, third, fourth and fifth columns of the second row are labeled V(x−2, y+1), V(x−1, y+1), V(x, y+1), V(x+1, y+1) and V(x+2, y+1). V(x, y) shows the interpolated pixel and is inserted between the first and the second rows of the image field at the third column.

In FIG. 2, a label $d_{11}$ represents a data difference between pixels V(x−2, y−1) and V(x, y+1), a label $d_{12}$ represents a data difference between pixels V(x−1, y−1) and V(x+1, y+1), a label $d_{13}$ represents a data difference between pixels V(x, y−1) and V(x+2, y+1), a label $d_{21}$ represents a data difference between pixels V(x−1, y−1) and V(x−1, y+1), a label $d_{22}$ represents a data difference between pixels V(x, y−1) and V(x, y+1), a label $d_{23}$ represents a data difference between pixels V(x+1, y−1) and V(x+1, y+1), a label $d_{31}$ represents a data difference between pixels V(x, y−1) and V(x−2, y+1), a label $d_{32}$ represents a data difference between pixels V(x+1, y−1) and V(x−1, y+1), and a label $d_{33}$ represents a data difference between pixels V(x+2, y−1) and V(x, y+1). The deinterlacing technique of the invention estimates the data of the interpolated pixel V(x, y) based on the data difference.

Figure 3:
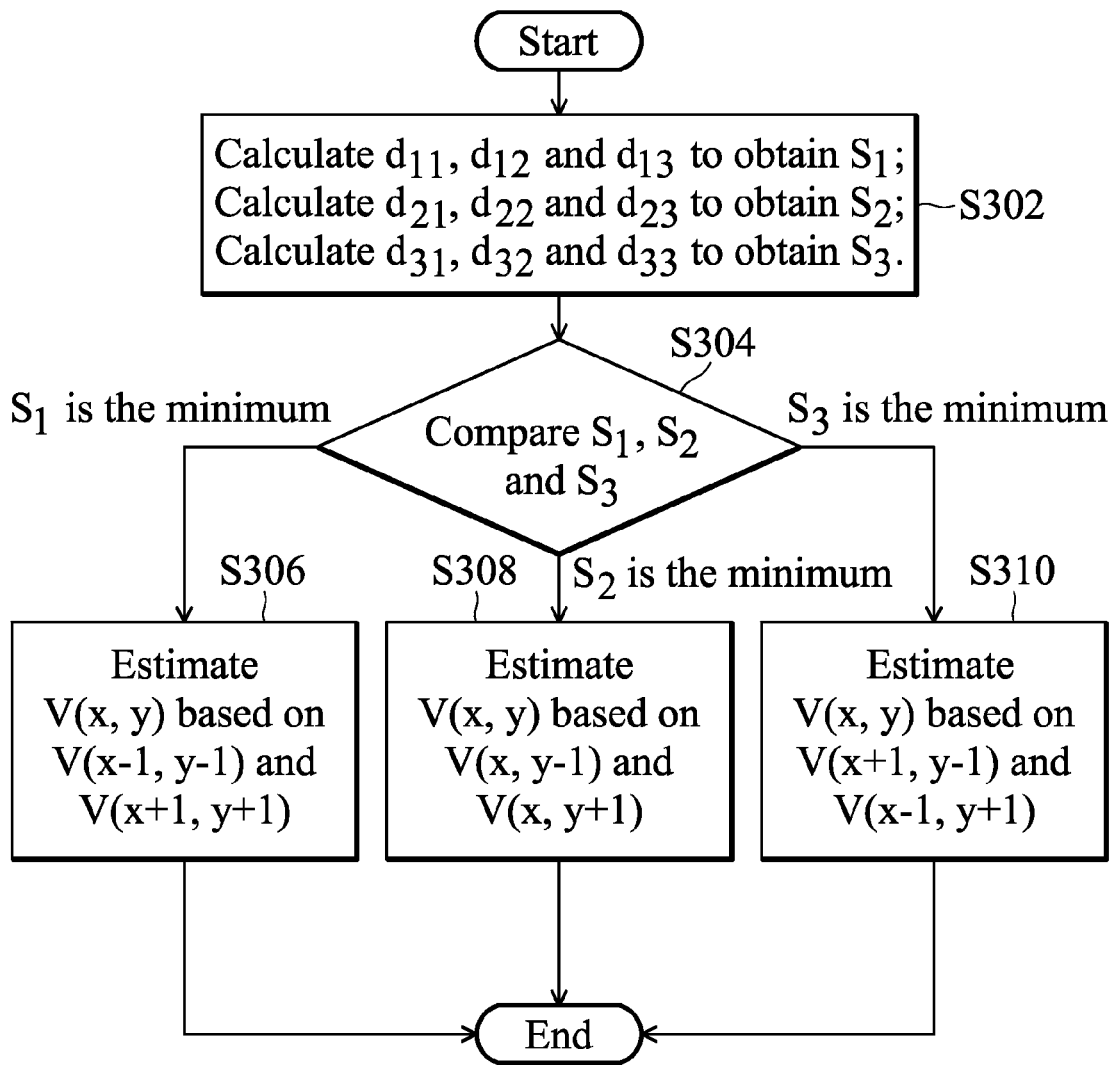
FIG. 3 shows a flowchart depicting the data estimation for the interpolated pixel V(x, y) in accordance with the invention.

FIG. 3 shows a flowchart depicting the estimation for the data of the interpolated pixel V(x, y) in accordance with the invention. The process shown in the flowchart can be implemented by the deinterlacing module 108 shown in FIG. 1 or by the firmware of an electronic device, or by other techniques know by those skilled in the art. In step S302, the data difference $d_{11} \ldots d_{13}, d_{21} \ldots d_{23}, d_{31} \ldots d_{33}$ are calculated. A sum value $S_1$ is obtained by summing the data difference $d_{11}$, $d_{12}$ and $d_{13}$, a sum value $S_2$ is obtained by summing the data difference $d_{21}$, $d_{22}$ and $d_{23}$, and a sum value $S_3$ is obtained by summing the data difference $d_{31}$, $d_{32}$ and $d_3$. In step S304, the three sum values $S_1$, $S_2$ and $S_3$ are compared with each other. When the minimum is $S_1$, step S306 is performed to estimate the data of the interpolated pixel V(x, y) according to the data of the pixels V(x−1, y−1) and V(x+1, y+1). When the minimum is $S_2$, step S308 is performed to estimate the data for the interpolated V(x, y) based on the data of the pixels V(x, y−1) and V(x, y+1). When the minimum is $S_3$, step S310 is performed to estimate the data for the interpolated pixel V(x, y) based on the pixels V(x+1, y−1) and V(x−1, y+1). The estimation realized in steps S306, S308 and S310 may be performed in various ways. For example, in step S306, the data for the interpolated pixel V(x, y) may be estimated by averaging the data of the pixels V(x−1, y−1) and V(x+1, y+1). In step S308, the data for the interpolated pixel V(x, y) may be estimated by averaging the data of the pixels V(x, y−1) and V(x, y+1). In step S310, the data for the interpolated pixel V(x, y) may be estimated by averaging the data of the pixels V(x+1, y−1) and V(x−1, y+1).

Figure 4:
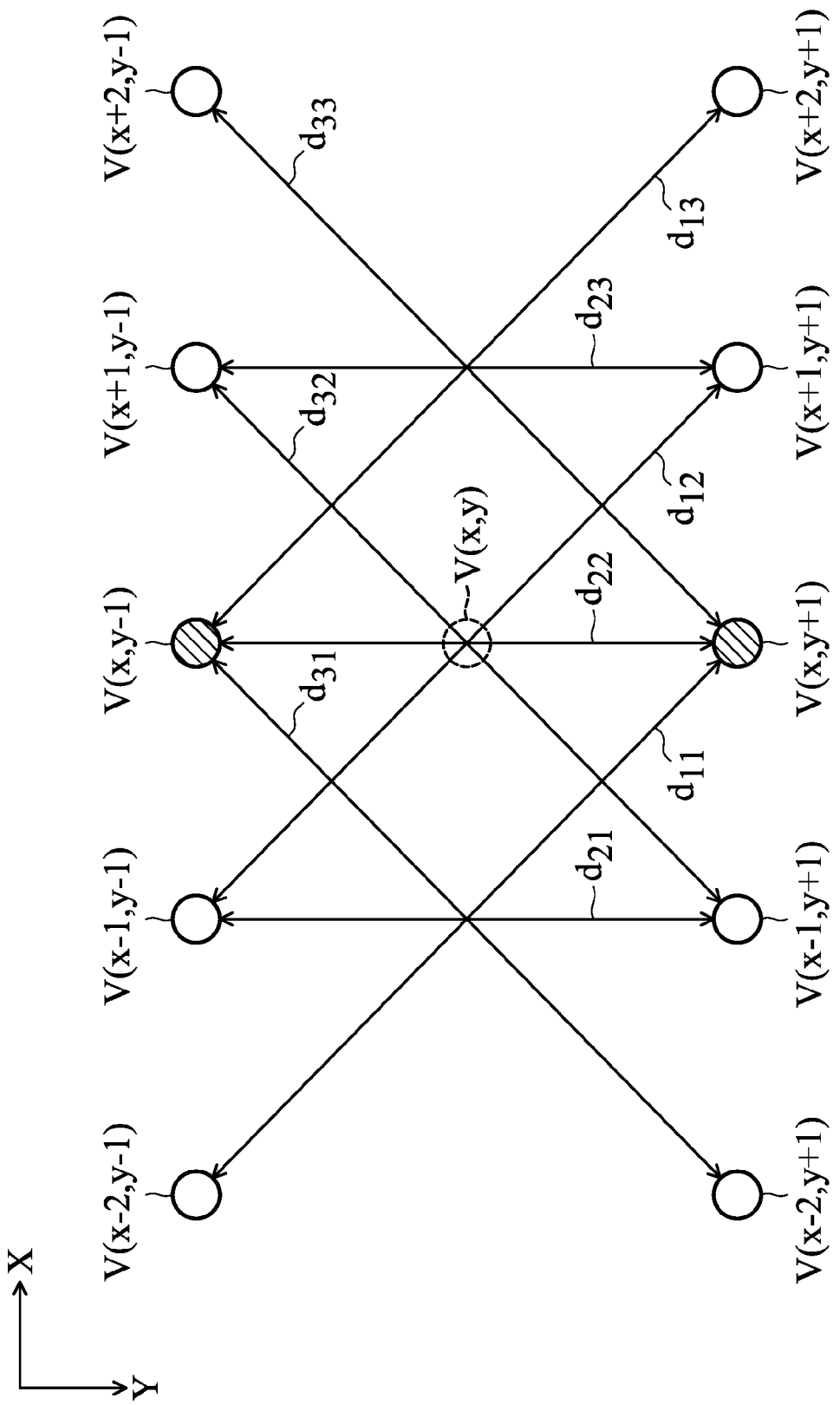
FIG. 4 depicts an example showing benefits from the deinterlacing process of the invention.

FIG. 4 depicts an example showing benefits from the deinterlacing process in accordance with the invention. FIG. 4 shows ten pixels of an image field, wherein a line is shown on the third column (X=x) of the image field. As shown, the pixels V(x−2, y−1), V(x−1, y−1), V(x+1, y−1), V(x+2, y−1), V(x−2, y+1), V(x−1, y+1), V(x+1, y+1) and V(x+2, y+1) are all blank and only pixels V(x, y−1) and V(x, y+1) are darkened. With the deinterlacing process of FIG. 3, it is easy to determine that the sum value $S_2$ (sum of the data difference $d_{21}$, $d_{22}$ and $d_{23}$) is the minimum one of $S_1$, $S_2$ and $S_3$, so that step S308 may be performed and the data for the interpolated pixel V(x, y) may be estimated based on the data of the pixels V(x, y−1) and V(x, y+1). For example, the data for the interpolated pixel V(x, y) may be the average of the data of pixels V(x, y−1) and V(x, y+1). Thus, the interpolated pixel V(x, y) is not blank and the deinterlaced image frame fully shows the line on the third column (X=x).

Figure 5:
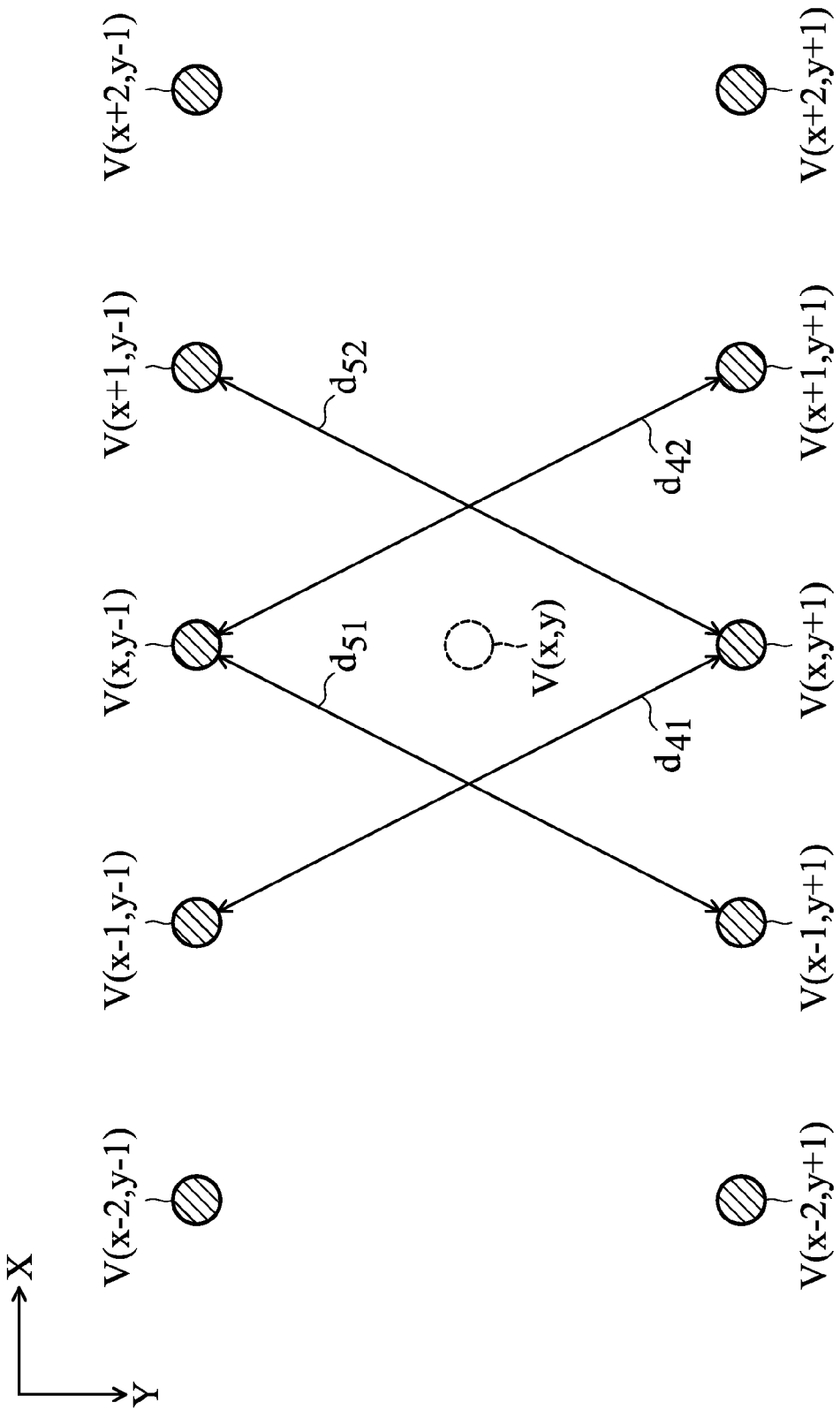
FIG. 5 shows other information which may be considered in the deinterlacing process.

The performance of the deinterlacing process may be further improved. Referring to FIG. 5, data difference $d_{41}$ between the pixels V(x−1, y−1) and V(x, y+1) and data difference $d_{42}$ between the pixels V(x, y−1) and V(x+1, y+1), data difference $d_{51}$ between the pixels V(x, y−1) and V(x−1, y+1) and data difference $d_{52}$ between the pixels V(x+1, y−1) and V(x, y+1) are further considered in the deinterlacing process.

Figure 6:
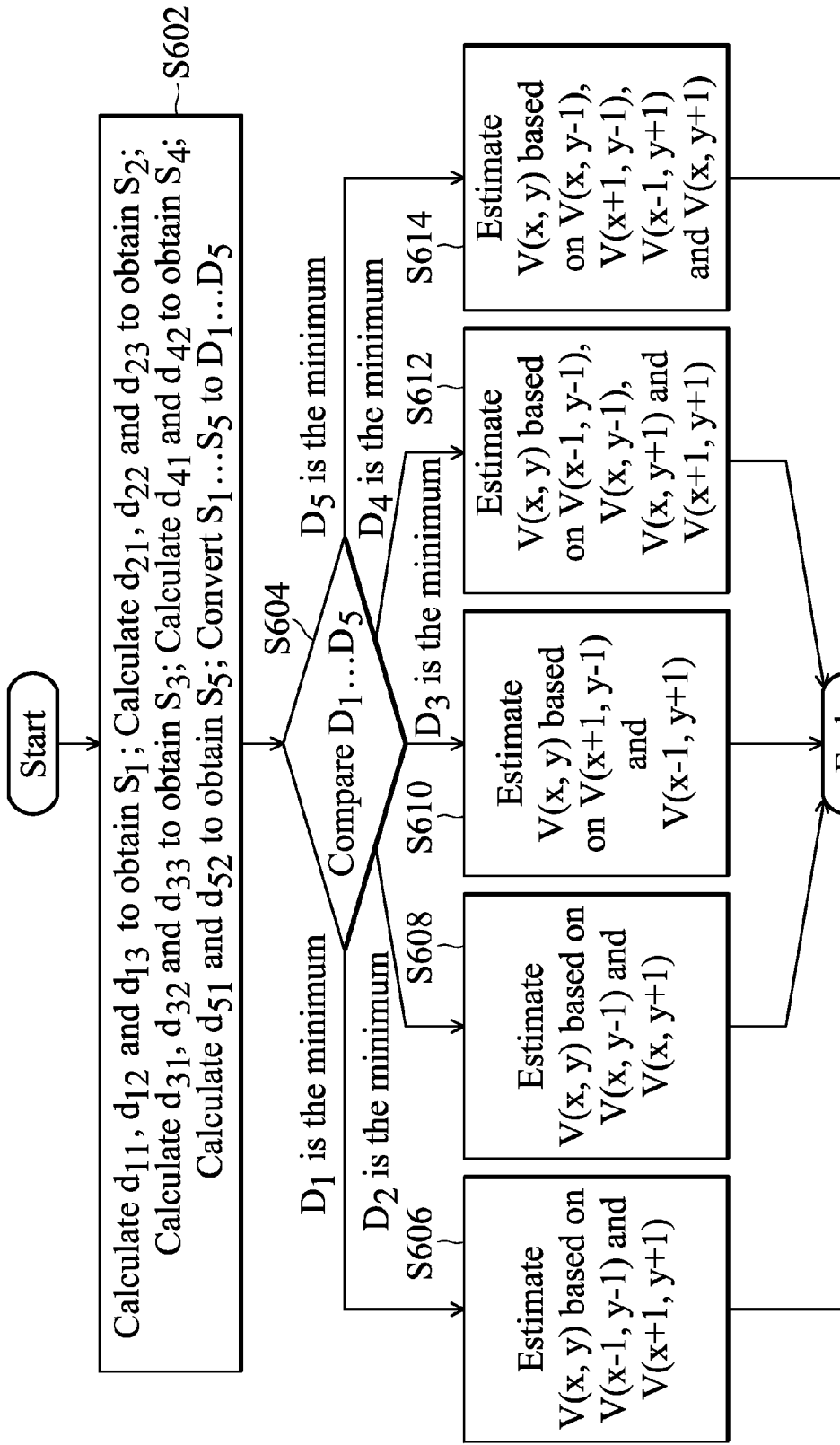
FIG. 6 is a flowchart depicting another deinterlacing process in accordance with the invention.

FIG. 6 is a flowchart depicting a deinterlacing process in accordance with the invention, and may be implemented by the deinterlacing module 108 of FIG. 1 or by a firmware of an electronic device or by other techniques, such as a software and hardware co-design. Compared to step S302 of FIG. 3, step S602 further calculates data difference $d_{41}$, $d_{42}$, $d_{51}$ and $d_{52}$ and obtains a sum value $S_4$ by summing the data difference $d_{41}$ and $d_{42}$ and a sum value $S_5$ by summing the data difference $d_{51}$ and $d_{52}$. Because the sampling rule of the sum values $S_4$ and $S_5$ are different from that of the sum values $S_1 \ldots S_3$, in step S602, the sum values $S_1 \ldots S_5$ are further provided with weighted factors to convert the sum value $S_1 \ldots S_5$ to the weighted sum value $D_1 \ldots D_5$, wherein $D_i=w_i \cdot S_i$, $i=1 \ldots 5$ and $w_i$ represent the weighted factors. In step S604, the weighted sum values $D_1 \ldots D_5$ are compared with each other. When the minimum is $D_1$, the process performs step S606 to estimate the data of the interpolated pixel V(x, y) based on the data of the pixels V(x−1, y−1) and V(x+1, y+1). When the minimum of the $D_2$, the process performs step S608 to estimate the data of the interpolated pixel V(x, y) according to the data of the pixels V(x, y−1) and V(x, y+1). When the minimum is $D_3$, the process performs of S610 to estimate the data of the interpolated pixel V(x, y) according to the data of the pixels V(x+1, y−1) and V(x−1, y+1). When the minimum is $D_4$, the process performs step S612 to estimate the data of the interpolated pixel V(x, y) based on the data of the pixels V(x−1, y−1), V(x, y−1), V(x, y+1) and V(x+1, y+1). When the minimum is $D_5$, the process performs step S614 to estimate the data of the interpolated pixel V(x, y) based on the data of the pixels V(x, y−1), V(x+1, y−1), V(x−1, y+1) and V(x, y+1). The data estimations shown in steps S606 . . . S614 may be realized by several methods. In step S606, the data of the interpolated pixel V(x, y) may be estimated by averaging the data of the pixels V(x−1, y−1) and V(x+1, y+1). In steps S608, the data of the interpolated pixel V(x, y) may be estimated by averaging the data of the pixels V(x, y−1) and V(x, y+1). In step S610, the data of the interpolated pixel V(x, y) may be estimated by averaging the data of the pixels V(x+1, y−1) and V(x−1, y+1). In step S612, the data of the interpolated pixel V(x, y) may be estimated by averaging the data of the pixels V(x−1, y−1), V(x, y−1), V(x, y+1) and V(x+1, y+1). In step S614, the data of the interpolated pixel V(x, y) may be estimated by averaging the data of the pixels V(x, y−1), V(x+1, y−1), V(x−1, y+1) and V(x, y+1).

The deinterlacing process introduced in FIGS. 5 and 6 can perfectly deinterlace the image of stripes (such as the image of railings). The stripes of the railings can be completely shown in the deinterlaced image frame.

Figure 7:
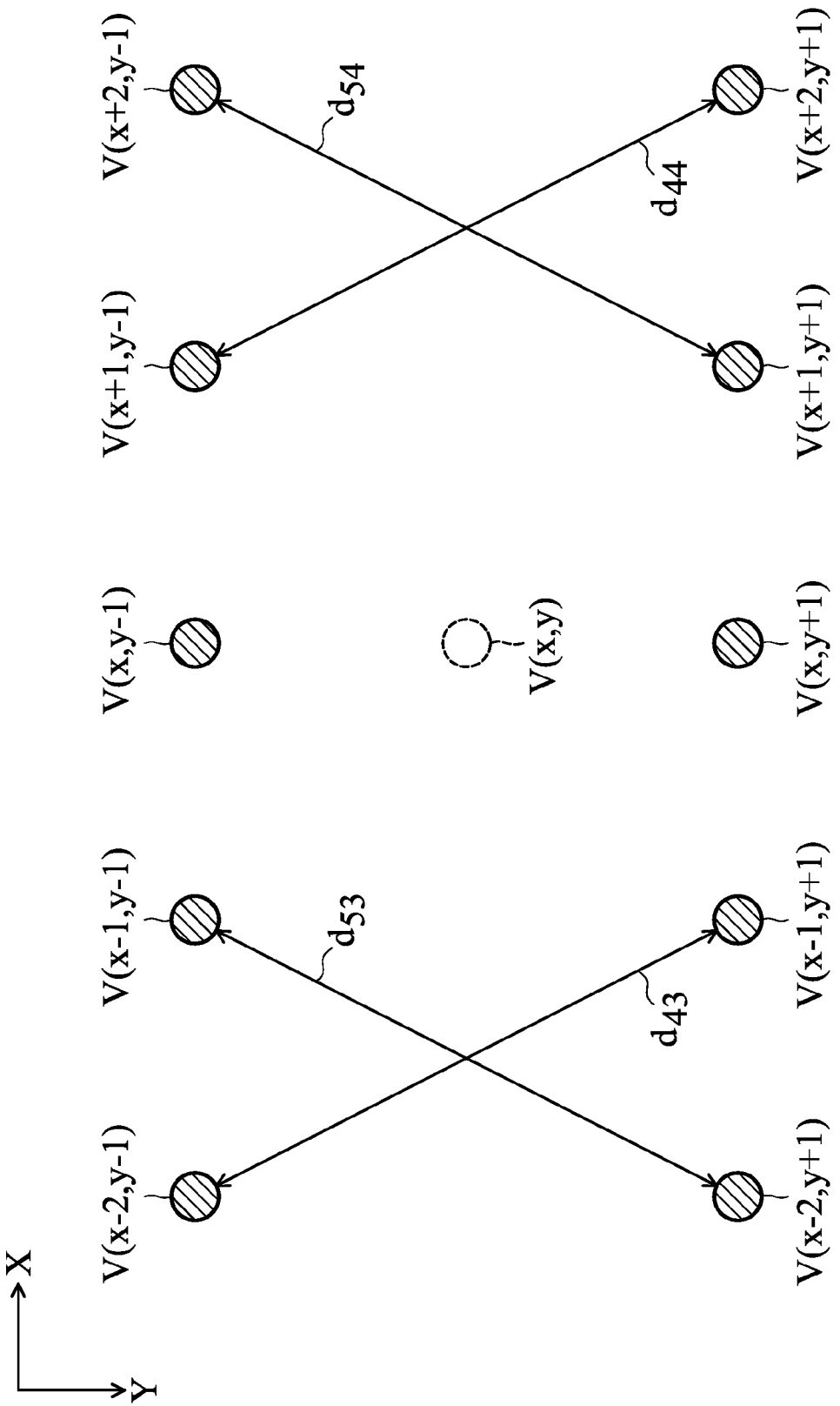
FIG. 7 shows other information which may be considered in the deinterlacing process.

FIG. 7 further depicts another deinterlacing technique in accordance with the invention, the estimation for the data of the interpolated pixel V(x, y) may further consider data difference $d_{43}$ between the data of the pixels V(x−2, y−1) and V(x−1, y+1), data difference $d_{44}$ between the data of the pixels V(x+1, y−1) and V(x+2, y+1), data difference $d_{53}$ between the data of the pixels V(x−1, y−1) and V(x−2, y+1) and data difference $d_{54}$ between the data of the pixels V(x+2, y−1) and V(x+1, y+1). The calculation of the sum values $S_4$ and $S_5$, the weighted factors for calculating the weighted sum values $D_1 \ldots D_5$, and the steps S612 and S614 are adjusted accordingly.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. An image processing device, comprising:
   a memory, in which an image field is temporarily stored;
   a data bus and a line buffer, coupled to the memory to convey and buffer data of ten pixels of the image field, wherein the ten pixels are located on a first column, a second column, a third column, a fourth column and a fifth column of a first row and a second row of the image field; and a deinterlacing module, coupled to the line buffer, estimating data of an interpolated pixel according to the data of the ten pixels, wherein the interpolated pixel is inserted between the first and second rows of the image field on the third column to form a deinterlaced image frame, wherein the deinterlacing module further calculates:

a first first data difference between the pixels of the first row, first column and the second row, third column of the image field, a first second data difference between the pixels of the first row, second column and the second row, fourth column of the image field, a first third data difference between the pixels of the first row, third column and the second row, fifth column of the image field, a second first data difference between the pixels of the first row, second column and the second row, second column of the image field, a second second data difference between the pixels of the first row, third column and the second row, third column of the image field, a second third data difference between the pixels of the first row, fourth column and the second row, fourth column of the image field, a third first data difference between the pixels of the first row, third column and the second row, first column of the image field, a third second data difference between the pixels of the first row, fourth column and the second row, second column of the image field, and a third third data difference between the pixels of the first row, fifth column and the second row, third column of the image field.

2. The image processing device as claimed in claim 1, wherein the deinterlacing module further sums the first first, the first second and the first third data difference to obtain a first sum value, sums the second first, the second second and the second third data difference to obtain a second sum value, and sums the third first, the third second and the third third data difference to obtain a third sum value.

3. The image processing device as claimed in claim 2, wherein the deinterlacing module further compares the first, the second and the third sum values, and when the minimum is the first sum value, the deinterlacing module estimates the data of the interpolated pixel according to the data of the pixels of the first row, second column and the second row, fourth column of the image field, and when the minimum is the second sum value, the deinterlacing module estimates the data of the interpolated pixel according to the data of the pixels of the first row, third column and second row, third column of the image field, and when the minimum is the third sum value, the deinterlacing module estimates the data of the interpolated pixel according to the data of the pixels of the first row, fourth column and the second row, second column of the image field.

4. The image processing device as claimed in claim 2, wherein the deinterlacing module further calculates a fourth first data difference between the pixels locating on the first row, second column and the second row, third column of the image field, a fourth second data difference between the pixels locating on the first row, third column and the second row, fourth column of the image field, a fifth first data difference between the pixels locating on the first row, third column and the second row, second column of the image field, and a fifth second data difference between the pixels locating on the first row, fourth column and the second row, third column of the image field.

5. The image processing device as claimed in claim 4, wherein the deinterlacing module further sums the fourth first and the fourth second data difference to obtain a fourth sum value, and sums the fifth first and the fifth second data difference to obtain a fifth sum value.

6. The image processing device as claimed in claim 5, wherein the deinterlacing module further provides the first, second, third, fourth and fifth sum values with weighted factors to obtain a first weighted sum value, a second weighted sum value, a third weighted sum value, a fourth weighted sum value and a fifth weighted sum value, respectively.

7. The image processing device as claimed in claim 6, wherein the deinterlacing module further compares the first, second, third, fourth and fifth weighted sum values, and estimates the data of the interpolated pixel based on the data of the pixels of the first row, second column and the second row, fourth column of the image field when the minimum is the first weighted sum value, based on the data of the pixels of the first row, third column and the second row, third column of the image field when the minimum is the second weighted sum value, based on the data of the pixels of the first row, fourth column, and the second row, second column of the image field when the minimum is the third weighted sum value, based on the data of the pixels of the first row, second column, the first row, third column, the second row, third column and the second row, fourth column of the image field when the minimum is the fourth weighted sum value, and based on the data of the pixels of the first row, third column, the first row, fourth column, the second row, second column and the second row, third column of the image field when the minimum is the fifth weighted sum value.

8. An image deinterlacing method, comprising:

reading a memory, in which an image field is temporarily stored, to retrieve data of ten pixels of the image field, wherein the ten pixels are located on a first column, a second column, a third column, a fourth column and a fifth column of a first row and a second row of the image field;

estimating data for an interpolated pixel based on the data of the ten pixels, wherein the interpolated pixel is inserted between the first and the second rows of the image field on the third column to form a deinterlaced image frame, wherein the step of estimating the data of the interpolated pixel comprises:

calculating a first first data difference between the pixels of the first row, first column and the second row, third column of the image field;

calculating a first second data difference between the pixels of the first row, second column and the second row, fourth column of the image field;

calculating a first third data difference between the pixels of the first row, third column and the second row, fifth column of the image field;

calculating a second first data difference between the pixels of the first row, second column and the second row, second column of the image field;

calculating a second second data difference between the pixels of the first row, third column and the second row, third column of the image field;

calculating a second third data difference between the pixels of the first row, fourth column and the second row, fourth column of the image field;

calculating a third first data difference between the pixels of the first row, third column and the second row, first column of the image field;

calculating a third second data difference between the pixels of the first row, fourth column and the second row, second column of the image field; and calculating a third third data difference between the pixels of the first row, fifth column and the second row, third column of the image field.

9. The image deinterlacing method as claimed in claim 8, wherein the step of estimating the data of the interpolated pixel further comprises:

summing the first first, the first second and the first third data difference to obtain a first sum value;

summing the second first, the second second and the second third data difference to obtain a second sum value; and summing the third first, the third second and the third third data difference to obtain a third sum value.

10. The image deinterlacing method as claimed in claim 9, wherein the step of estimating the data of the interpolated pixel further comprises:

comparing the first, second and third sum values;

estimating the data of the interpolated pixel according to the data of the pixels of the first row, second column and the second row, fourth column when the minimum is the first sum value;

estimating the data of the interpolated pixel according to the data of the pixels of the first row, third column and the second row, third column when the minimum is the second sum value; and estimating the data of the interpolated pixel according to the data of the pixels of the first row, fourth column and the second row, second column when the minimum is the third sum value.

11. The image deinterlacing method as claimed in claim 9, wherein the step of estimating the data of the interpolated pixel further comprises:

calculating a fourth first data difference between the pixels of the first row, second column and the second row, third column of the image field;

calculating a fourth second data difference between the pixels of the first row, third column, and the second row, fourth column of the image field;

calculating a fifth first data difference between the pixels of the first row, third column and the second row, second column of the image field; and calculating a fifth second data difference between the pixels of the first row, fourth column and the second row, third column of the image field.

12. The image deinterlacing method as claimed in claim 11, wherein the step of estimating the data of the interpolated pixel further comprises:

summing the fourth first and the fourth second data difference to obtain a fourth sum value; and summing the fifth first and the fifth second data difference to obtain a fifth sum value.

13. The image deinterlacing method as claimed in claim 12, wherein the step of estimating the data of the interpolated pixel further comprises:

providing the first, second, third, fourth and fifth sum values with weighted factors to obtain a first weighted sum value, a second weighted sum value, a third weighted sum value, a fourth weighted sum value and a fifth weighted sum value, respectively.

14. The image deinterlacing method as claimed in claim 13, wherein the step of estimating the data of the interpolated pixel further comprises:

comparing the first, second, third, fourth and fifth weighted sum values;

estimating the data of the interpolated pixel according to the data of the pixels of the first row, second column and the second row, fourth column of the image field when the minimum is the first weighted sum value;

estimating the data of the interpolated pixel according to the data of the pixels of the first row, third column and the second row, third column of the image field when the minimum is the second weighted sum value;

estimating the data of the interpolated pixel according to the data of the pixels of the first row, fourth column and the second row, second column of the image field when the minimum is the third weighted sum value;

estimating the data of the interpolated pixel according to the data of the pixels of the first row, second column, the first row, third column, the second row, third column and the second row, fourth column of the image field when the minimum is the fourth weighted sum value; and estimating the data of the interpolated pixel according to the data of the pixels of the first row, third column, the first row, fourth column, the second row, second column and the second row, third column of the image field when the minimum is the fifth weighted sum value.

* * * * *